US012605233B2

(12) United States Patent
Alves Costa

(10) Patent No.: US 12,605,233 B2
(45) Date of Patent: Apr. 21, 2026

(54) ZYGOMATIC DENTAL IMPLANT SET

(71) Applicant: IMPLACIL OSSTEM—MATERIAL ODONTOLÓGICO S.A., São Paulo (BR)

(72) Inventor: Elton Faco Alves Costa, Sorocaba (BR)

(73) Assignee: IMPLACIL OSSTEM—MATERIAL ODONTOLÓGICO S.A., São Paulo (BR)

( * ) Notice: Subject to any disclaimer, the term of this patent is extended or adjusted under 35 U.S.C. 154(b) by 184 days.

(21) Appl. No.: 18/493,620

(22) Filed: Oct. 24, 2023

(65) Prior Publication Data

US 2024/0130838 A1 Apr. 25, 2024
US 2024/0225793 A9 Jul. 11, 2024

(30) Foreign Application Priority Data

Oct. 24, 2022 (BR) ...................... 10 2022 021558-8

(51) Int. Cl.
*A61C 8/00* (2006.01)

(52) U.S. Cl.
CPC .......... *A61C 8/0069* (2013.01); *A61C 8/0034* (2013.01); *A61C 8/0068* (2013.01)

(58) Field of Classification Search
CPC ... A61C 8/0069; A61C 8/0034; A61C 8/0068; A61C 8/00

(Continued)

(56) References Cited

U.S. PATENT DOCUMENTS 11,141,245 B2   10/2021   Rosen et al.
2022/0008171 A1   1/2022   Tschopp et al.

FOREIGN PATENT DOCUMENTS

BR   102017020639 A2   4/2019
BR   132019012807 E2   1/2021
(Continued)

OTHER PUBLICATIONS

Elton et al., Zygomatic Pillar Prosthetic Intermediate Component, BR 102017020639 A2, machine translation (Year: 2019).*
(Continued)

*Primary Examiner* — Eric J Rosen
*Assistant Examiner* — Mirayda A Aponte
(74) *Attorney, Agent, or Firm* — POLSINELLI PC

(57) ABSTRACT

The present invention relates to a dental implant set, more precisely to a zygomatic dental implant set for in-bone dental implant surgeries of the zygomatic arch via intraoral access. The zygomatic dental implant set (100) comprises an implant pin (10) configured to be anchored in the zygomatic bone; an intermediate connecting member (20) comprising a curved shape; wherein a first end (21) of the intermediate connecting member (20) is configured to be coupled directly or indirectly to the implant pin (10); a first extender (30), wherein the first extender (30) is coupled to a second end (22) of the intermediate connecting member (20); a prosthetic abutment (40), wherein a first end (41) of the prosthetic abutment (40) comprises an outer thread (42), wherein the outer thread (42) of the prosthetic abutment (40) is coupled to a first inner thread (23) of the intermediate connecting member (20); and wherein a second end (43) of the prosthetic abutment (40) is configured to receive a dental prosthesis.

9 Claims, 13 Drawing Sheets

(58) Field of Classification Search
USPC ...................................... 433/147–176, 201.1
See application file for complete search history.

(56) References Cited

FOREIGN PATENT DOCUMENTS

CN      112826618 A      5/2021
WO      2021078830 A1     4/2021

OTHER PUBLICATIONS

Dalton , Improvement Introduced In Angled Abutment To Fix Restorations In Fixed Prosthesis, BR 102015007626 A2, machine translation (Year: 2017).*

* cited by examiner

1

Figure 1 (State of the Art)

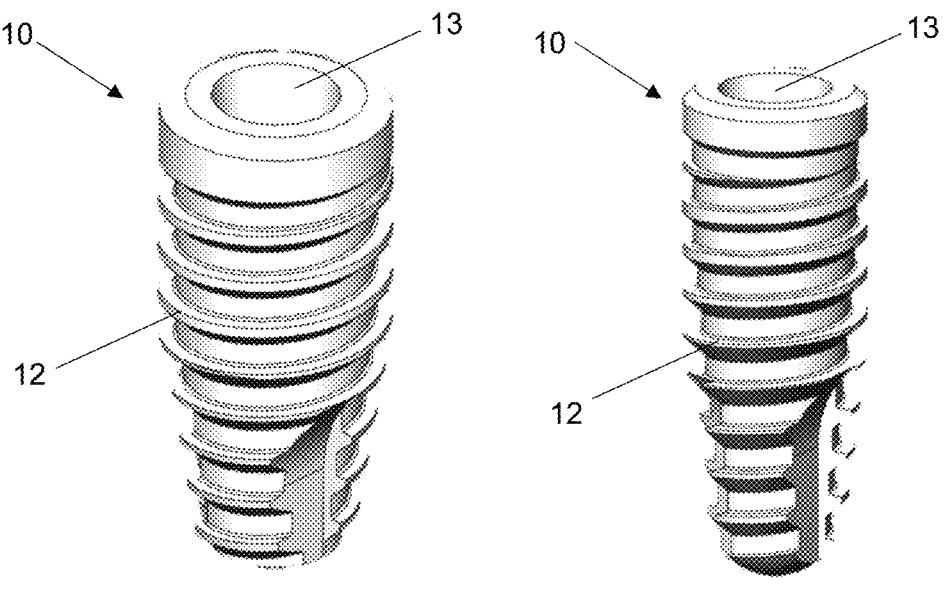
Figure 3a                    Figure 3b
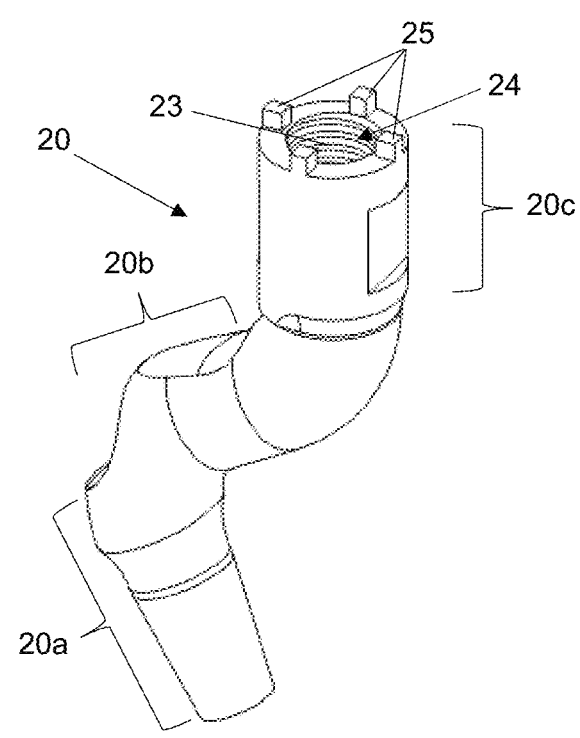
Figure 4

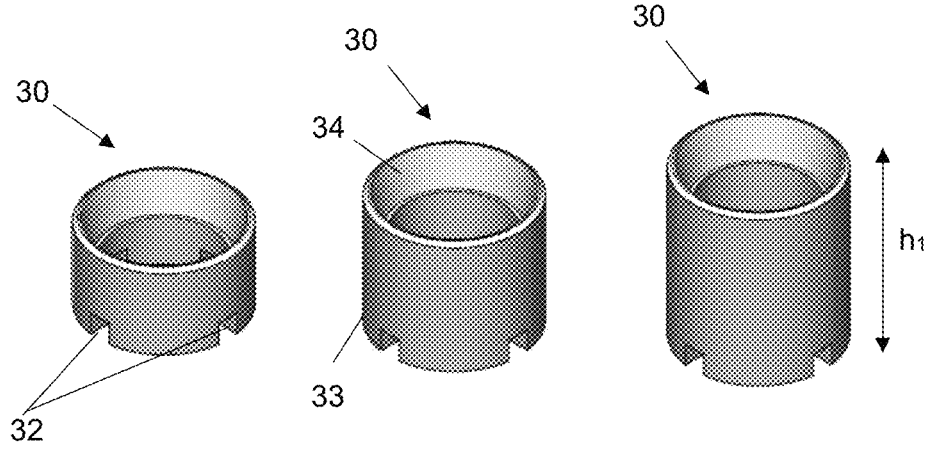
Figure 8
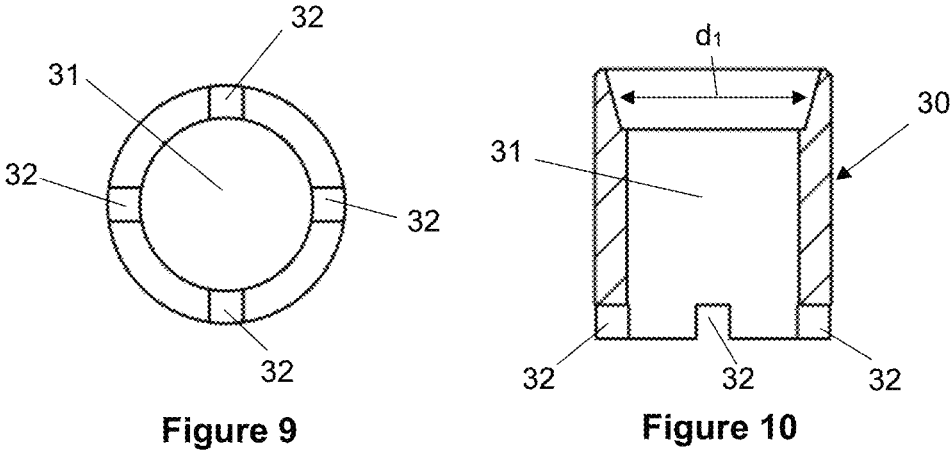
Figure 9          Figure 10

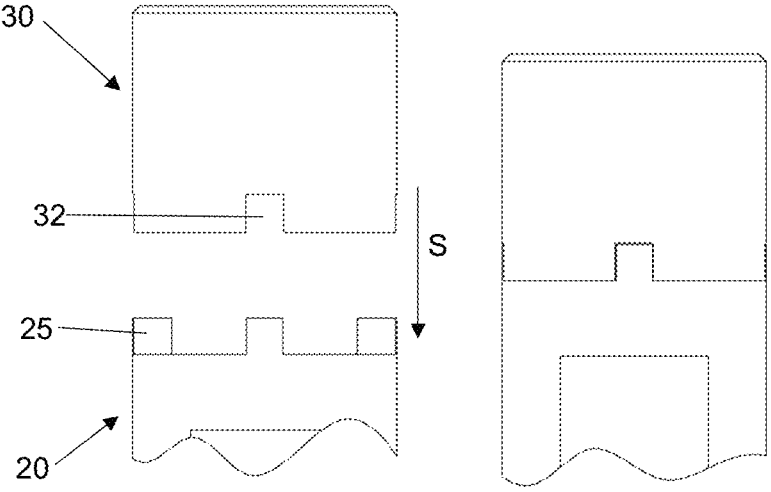
Figure 11
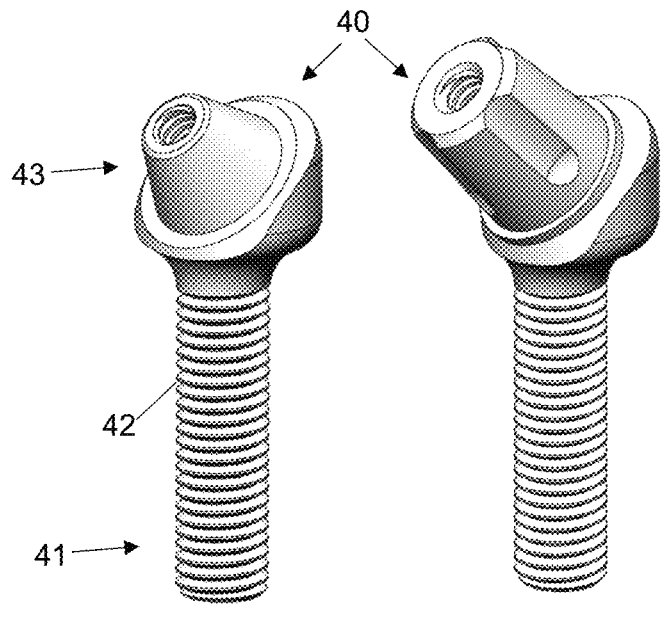
Figure 12a Figure 12b

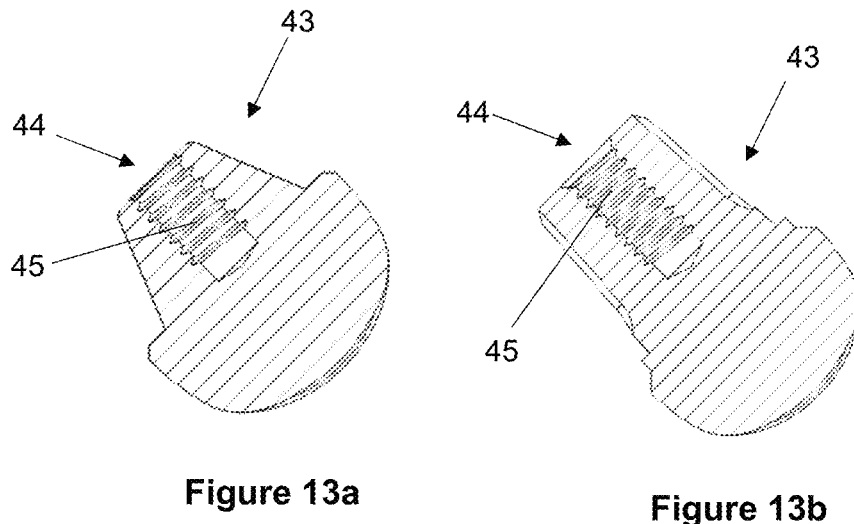
Figure 13a                    Figure 13b
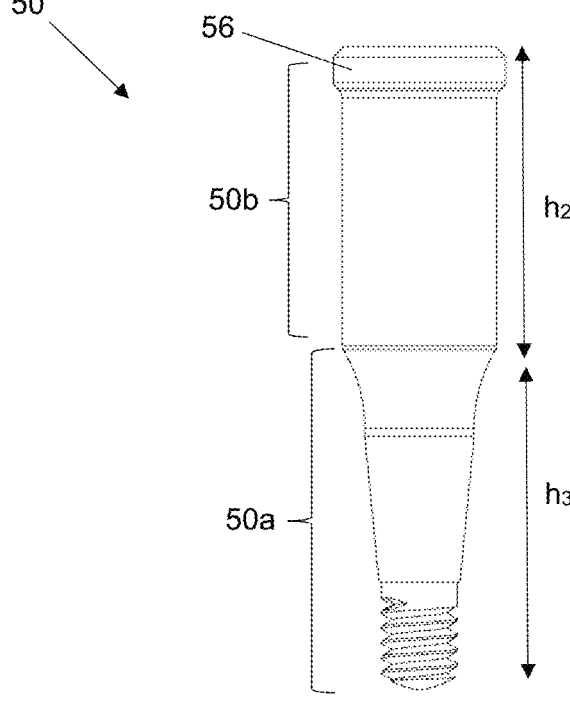
Figure 14

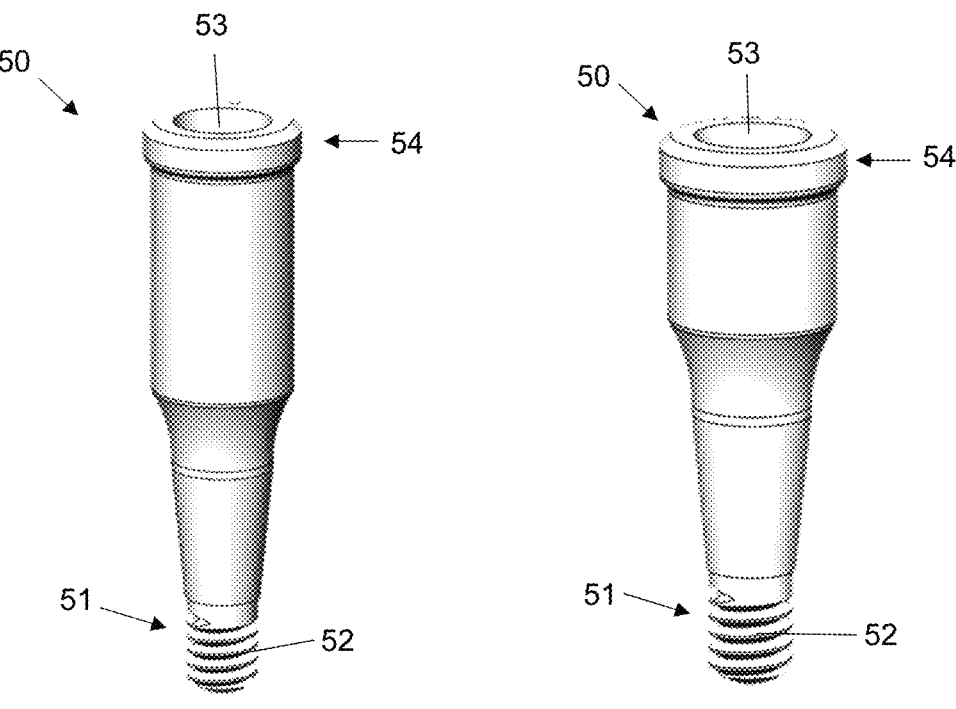
Figure 15a                    Figure 15b
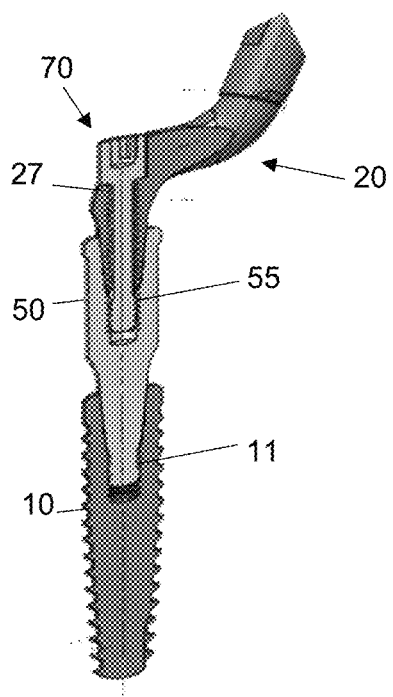
Figure 16

60
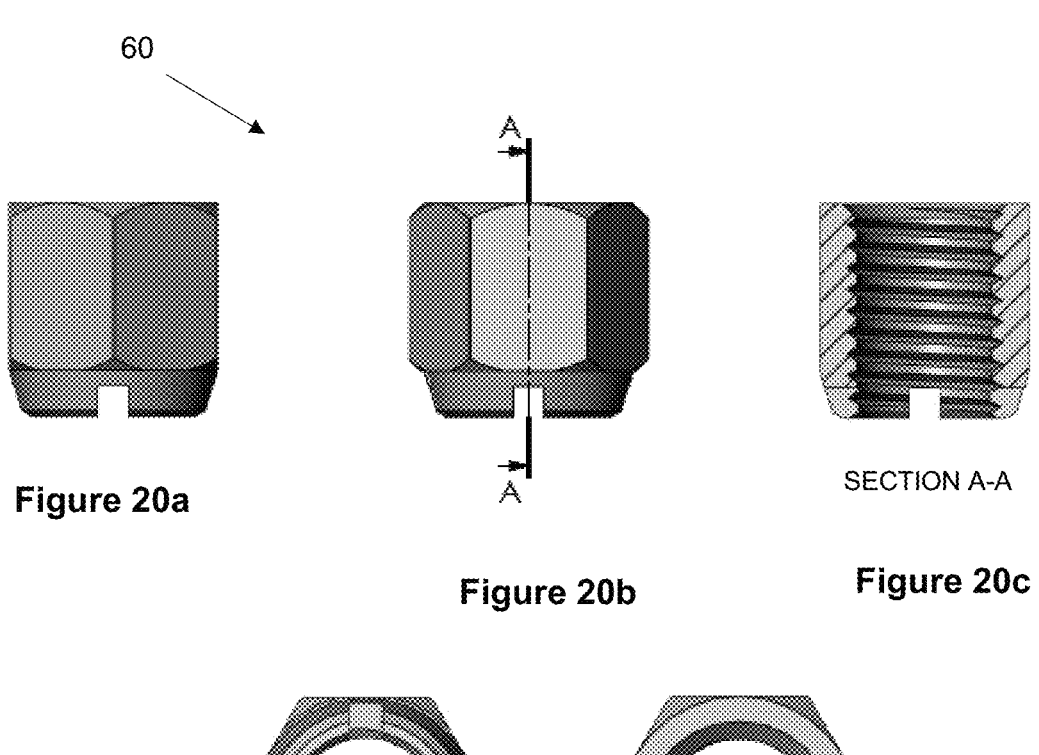
Figure 20a
SECTION A-A
Figure 20b
Figure 20c
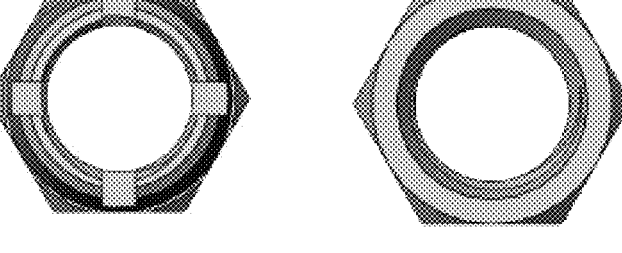
Figure 20d          Figure 20e
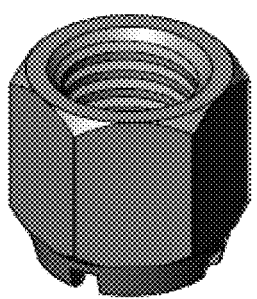
Figure 20f

ZYGOMATIC DENTAL IMPLANT SET

CROSS-REFERENCE TO RELATED APPLICATIONS

This application claims priority to Application No. BR 10 2022 021558-8 filed in Brazil on Oct. 24, 2022, under 35 U.S.C. § 119. The entire contents are hereby incorporated by reference.

FIELD OF INVENTION

The present invention relates to a dental implant set, more precisely to a zygomatic dental implant set for in-bone dental implant surgeries of the zygomatic arch via intraoral access.

BACKGROUND OF THE INVENTION

Sets of dental implants or simply dental implants are metal structures or metal supports, generally made of titanium, surgically positioned in facial bones such as the maxilla and mandible, replacing tooth roots or in the case of fixation in the zygomatic bone, where there is no roots, serving as support for coupling the prosthesis assembly.

The use of sets of zygomatic implants through surgical techniques promotes oral rehabilitation in the maxilla, since implant pins are fixed in the zygomatic bone. This type of technique is normally indicated for patients with severe bone loss in the upper jaw caused by tooth loss, this severe bone loss is often due to bone absorption caused by inflammation or lack of chewing function for a prolonged period of time, making it impossible to create complete dentures leading the patient to functional and social problems (difficulty in eating and speaking) and psychological problems (embarrassment due to missing teeth and difficulties in communication), the solution presented has the advantage of promoting a possible treatment for the case of atrophic jaws.

Dental implants configured for anchoring in the zygomatic bone are already known in the art. FIG. 1 shows, for illustrative purposes only, a set of intermediate components 1 of an implant set, that is, components located between an implant pin and a dental prosthesis (not illustrated).

Prior art document CN112826618 discloses a bent trans zygomatic implant structure, wherein the implant body is curved so as to be closer to the anterior and lateral concave wall of the maxillary sinus or partially embedded in the jaw. The inner wall of the anterior and lateral walls keeps the body away from the soft tissue layer of the oral cavity and reduces the incidence of exposure of the oral cavity. This structure is mainly intended for patients with obvious depression of the anterior and lateral wall of the maxillary sinus or for patients with severe vertical and horizontal absorption of the maxilla.

The prior art document BR 10 2017 020639-4 discloses an intermediate dental prosthetic component, consisting of two parts that are joined in a threadable manner, applicable in zygomatic implants. The implants are inserted in a screwed manner through a surgical process in an intraoral procedure in a conventional implant surgically installed together with an anti-rotational Morse cone prosthesis member. This method is indicated for patients with severe bone loss and who cannot undergo bone graft procedures.

In general, the use of these conventional, state-of-the-art implants presents advantages, such as:

low surgical morbidity;

simplicity, which allows the procedure to be carried out in a non-hospital environment and promotes an increase in the number of professionals who use it; and reduced costs, which increases the population's ability to access treatment.

However, despite recent advances in the field of zygomatic implants, there are still drawbacks to be overcome in the state of the art.

As noted in the documents cited above, the state of the art lacks solutions that serve patients in a more individualized way, since each patient is different from another and requires specific care.

In particular, it is worth noting that bone loss causes major changes in a patient's maxillofacial structure, so it is necessary to develop solutions for individualizing zygomatic dental implant sets/structures, allowing them to be used safely in all patient profiles.

DESCRIPTION OF THE INVENTION

Therefore, a general objective of the present invention is to provide a zygomatic dental implant set capable of eliminating or at least reducing the currently known limitations of the state of the art.

A particular objective of the present invention is to provide a zygomatic dental implant set capable of being adapted to the specificities of each patient.

Another particular object of the present invention is to provide a dental implant set that couples to the zygomatic bone via a conventional implant pin.

Another objective of the present invention is to provide a set of dental implants whose surgery for anchoring them in the zygomatic bone and fixing dental prostheses occurs with the lowest possible risk and with the highest degree of success, thus avoiding the use of hospitalization in hospitals, reducing costs and complications to the patient.

Another particular object of the present invention is to provide a zygomatic dental implant set with improved mechanical stability and strength.

One or more of the above-mentioned objects of the present invention, among others, is/are achieved by means of a zygomatic dental implant set comprising: an implant pin configured to be anchored in the zygomatic bone; an intermediate connecting member comprising a curved shape; wherein a first end of the intermediate connecting member is directly or indirectly coupled to the implant pin; a first extender, wherein the first extender is coupled to a second end of the intermediate connecting member; a prosthetic abutment, wherein a first end of the prosthetic abutment comprises an outer thread, wherein the outer thread of the prosthetic abutment is coupled to a first inner thread of the intermediate connecting member; and wherein a second end of the prosthetic abutment is configured to receive a dental prosthesis.

One or more objective(s) of the present invention mentioned above, among others, is(are) also achieved by means of a set of intermediate components for dental implant, comprising an intermediate connecting member comprising a curved shape; wherein a first end of the intermediate connecting member is configured to be directly or indirectly coupled to an implant pin; and a first extender, wherein the first extender is coupled to a second end of the intermediate connecting member.

BRIEF DESCRIPTION OF THE DRAWINGS

The objectives, technical effects and advantages of the present invention will be apparent to those skilled in the art from the following detailed description which makes reference to the attached figures, which illustrate exemplary, but not limiting, embodiments of the claimed objects:

FIGS. 3*a* and 3*b* show perspective views of implant pins suitable for fixation in the zygomatic bone;

FIG. 4 shows a perspective view of an intermediate connecting member, according to an embodiment of the present invention;

FIG. 8 shows variations of the first extender, according to embodiments of the present invention;

FIG. 9 shows a top view of the first extender, according to an embodiment of the present invention;

FIG. 10 shows a sectional view of the first extender, according to an embodiment of the present invention;

FIG. 11 shows a detail view of the coupling between the first extender and the intermediate connecting member, according to an embodiment of the present invention;

FIGS. 12*a* and 12*b* show variations of the prosthetic abutment, according to embodiments of the present invention;

FIGS. 13*a* and 13*b* show sectional views of the ends of the variations of the prosthetic abutment presented in FIGS. 12*a* and 12*b*, according to embodiments of the present invention;

FIG. 14 shows a front view of the second extender;

FIGS. 15*a* and 15*b* show perspective views of variations of the second extender, according to embodiments of the present invention;

FIG. 16 shows a sectional view of the coupling between the implant pin, the intermediate connecting member and the second extender, according to an embodiment of the present invention;

FIGS. 20*a* to 20*f* show orthogonal and sectional views of a nut, according to an embodiment of the present invention.

DESCRIPTION OF EMBODIMENTS OF THE INVENTION

It should be noted that the object of the present invention, a zygomatic dental implant set, is described below according to particular, but not limiting, embodiments, since its implementation can be carried out in different ways and variations and according to the application desired by a person skilled in the art.

The use of the term "a" or "an" in this specification does not indicate a limited amount, but the existence of at least one of the members/components/items listed. The use of the term "or" indicates any or all of the members/components/ items listed. The use of the term "comprising", "endowed", "provided" or a similar term indicates that the member/component/item listed in front of said term is part of the invention, but does not exclude other members/components/items not listed. The use of the term "associate", "connect" or similar terms may refer to physical, mechanical, pneumatic, fluidic, hydraulic, electrical, electronic or wireless connections, whether directly or indirectly.

Embodiments of the present invention provide a zygomatic dental implant set (100), recommended in particular for use in patients with severe bone loss in the jawbone. A possible fully assembled configuration of the set (100) is illustrated in FIG. 2.

Preferably, the components of the set (100) are manufactured by machining processes from any biocompatible materials with high mechanical resistance, such as metallic alloys. In particular, titanium alloys are particularly advantageous for manufacturing the components of the set (100).

Figure 1:
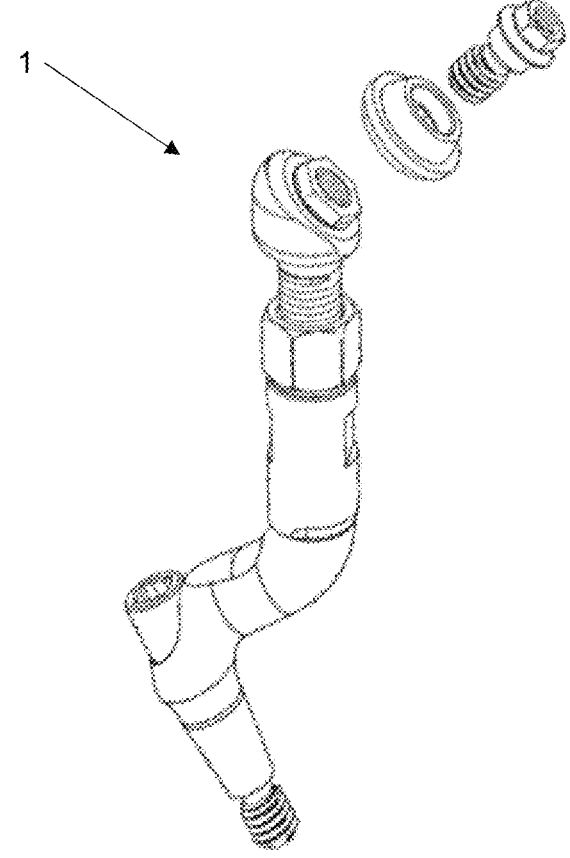
FIG. 1 shows an exploded perspective view of a zygomatic implant known in the prior art.
Figure 2:
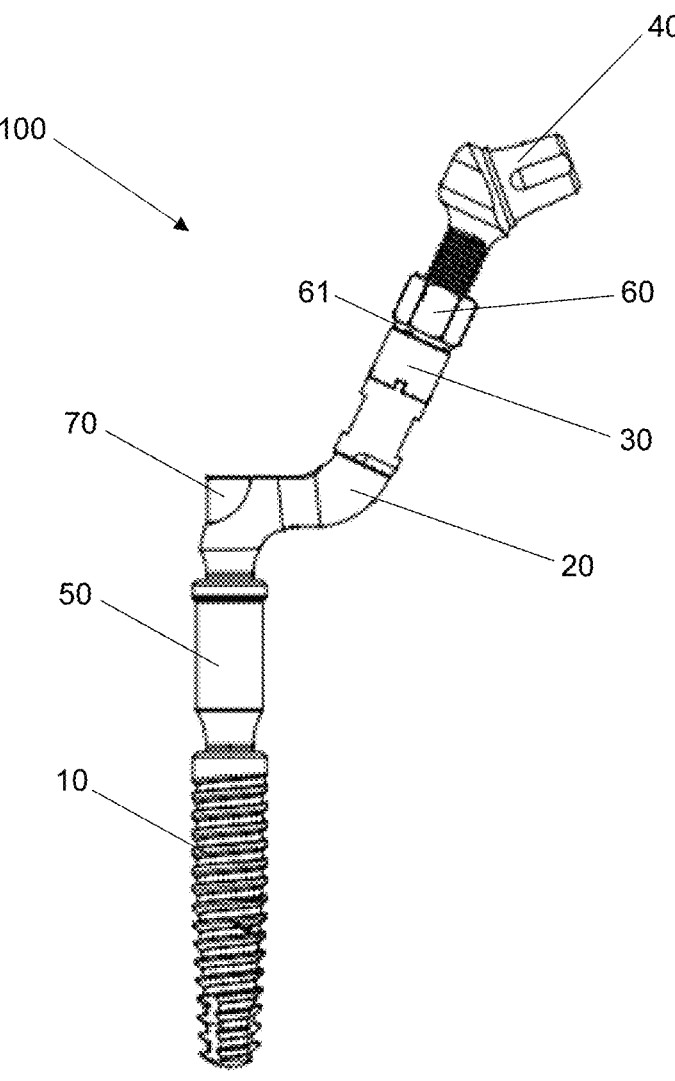
FIG. 2 shows a front view of a zygomatic dental implant set, object of the present invention.

As seen in FIG. 2, the zygomatic dental implant set of the present invention comprises an implant pin (10) that is configured to be anchored/coupled to the zygomatic bone of a patient.

The implant pin (10) comprises an elongated body of substantially conical/tapered shape or substantially cylindrical shape, comprising an outer thread (12) covering at least partially its external surface. The implant pin (10) may comprise a height between 7 and 15 mm, with a diameter varying between 3 and 5 mm.

Particularly advantageously, any conventional prior art implant pins (10) can be used in the set (100) of the present invention, provided that they are suitable for anchoring to the zygomatic bone. Alternatively, depending on the patient's clinical condition, the implant pin (10) may be suitable for anchoring in any other facial bone.

Examples of implant pins (10) suitable for use in the set (100) are illustrated in FIGS. 3*a* and 3*b*.

The zygomatic dental implant set (100) of the present invention also features an intermediate connecting member (20).

Figure 5:
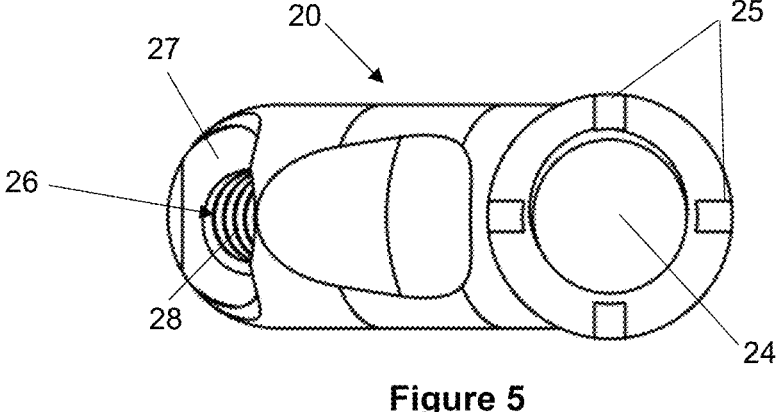
FIG. 5 shows a top view of an intermediate connecting member, according to an embodiment of the present invention.
Figure 6:
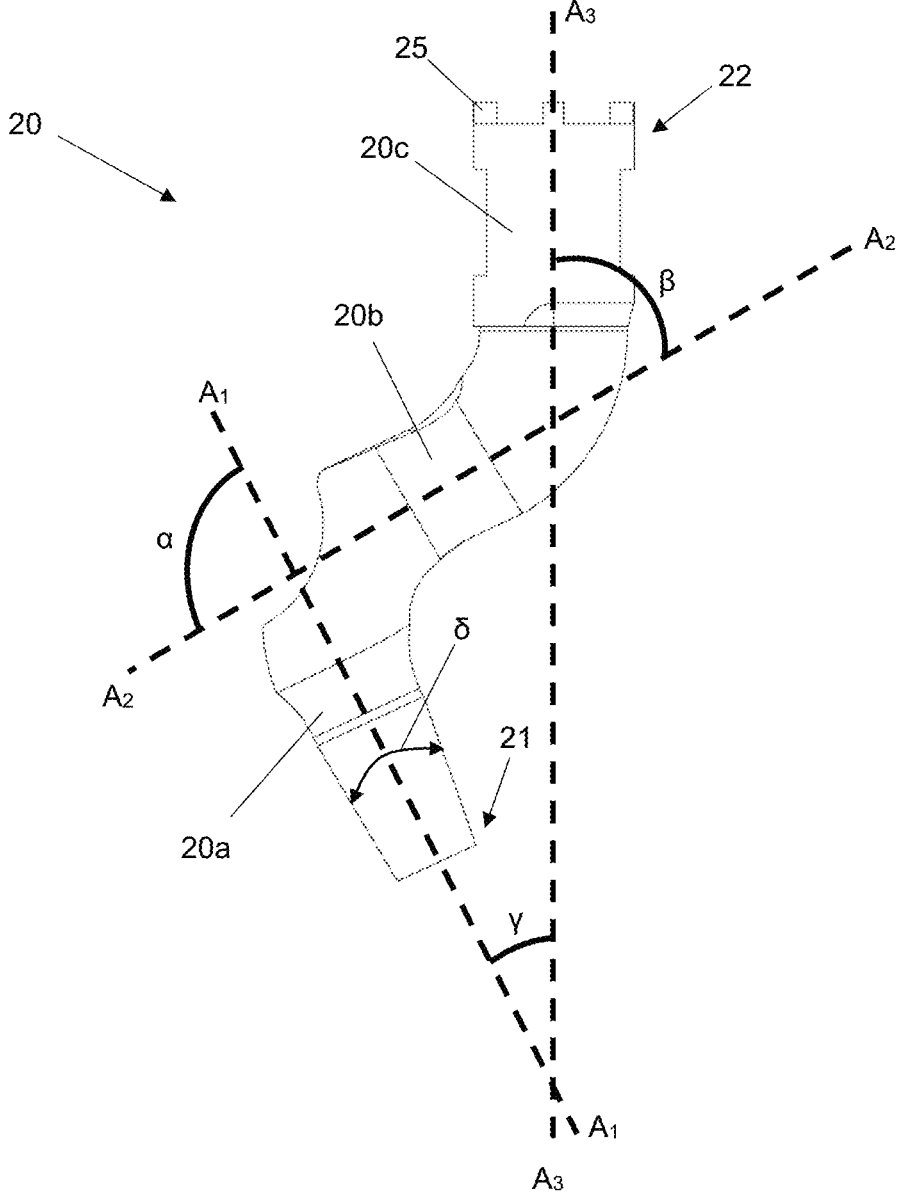
FIG. 6 shows a front view of an intermediate connecting member, according to an embodiment of the present invention.
Figure 7:
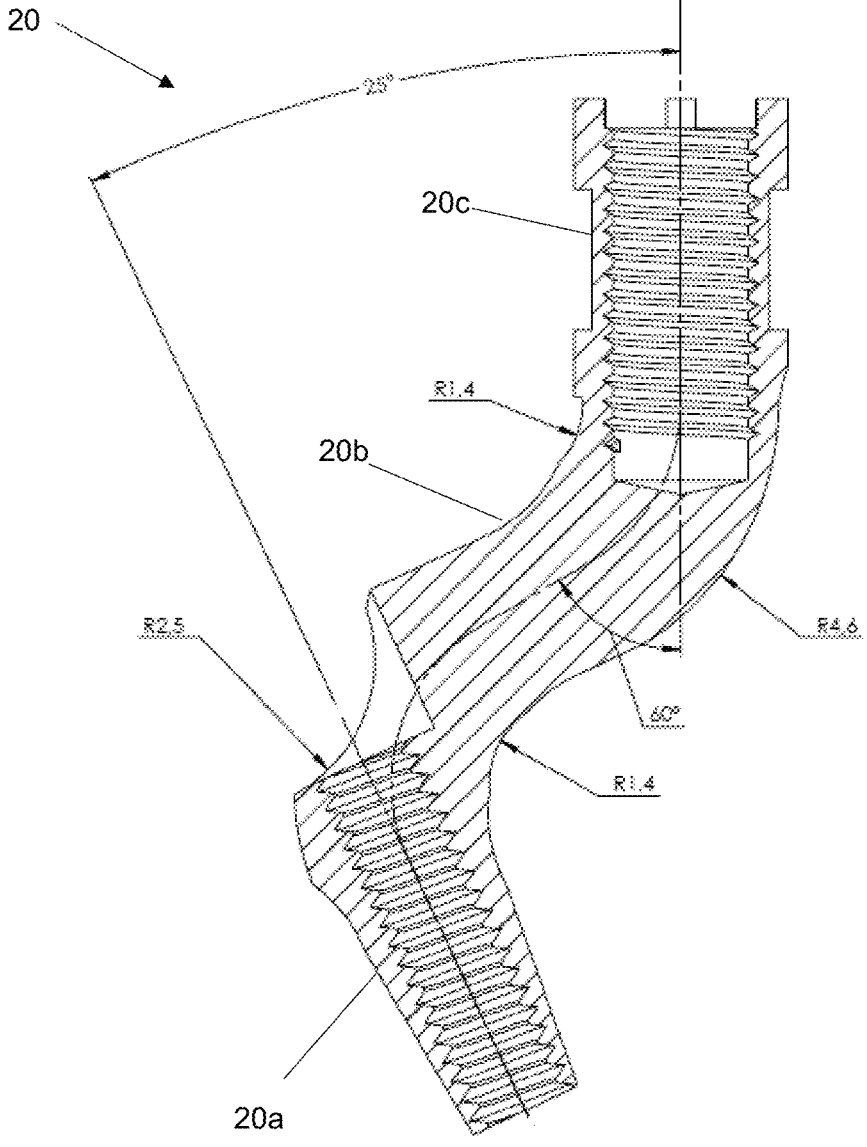
FIG. 7 shows a sectional view of an intermediate connecting member, according to an embodiment of the present invention.
Figure 17:
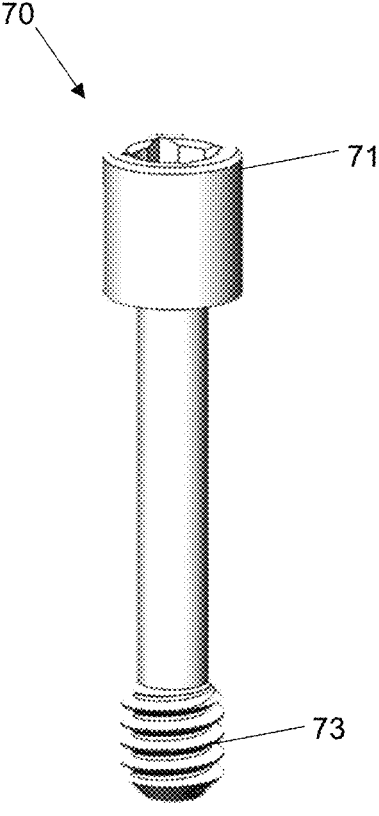
FIG. 17 shows a perspective view of a screw applied to the zygomatic dental implant set, object of the present invention.
Figure 18:
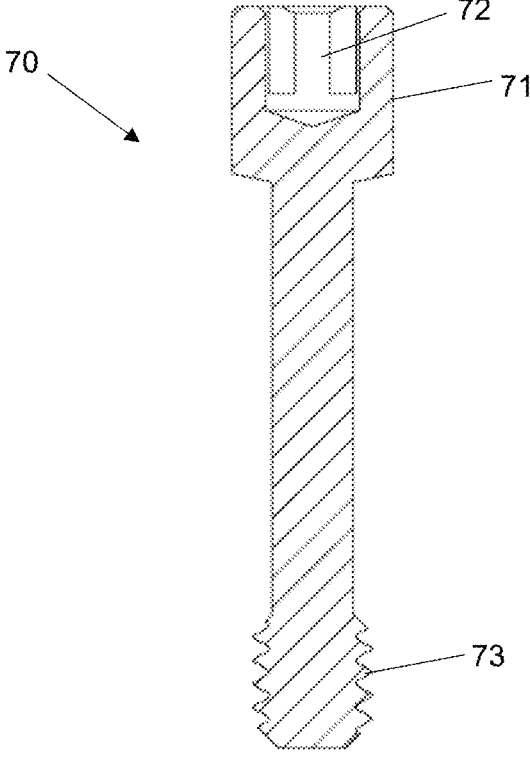
FIG. 18 shows a sectional view of the screw shown in FIG. 17.
Figure 19:
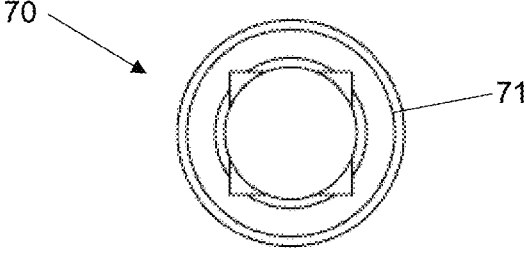
FIG. 19 shows a top view of the screw shown in FIG. 17.

The intermediate connecting member (20) has an elongated body with a substantially curved shape, such as approximately an "S", a "Z", an "L" or similar, as seen in FIGS. 4 to 6. The cross section of the intermediate connecting member (20) can be, for example, substantially circular, with an outer diameter varying between 2 and 5 mm, as seen in FIG. 7.

A first end (21) of the intermediate connecting member (20) is configured to be directly or indirectly coupled to the implant pin (10). Coupling and fixing the intermediate connecting member (20) to the implant pin (10) can be carried out using a screw (70), which will be further detailed below.

In one embodiment, the first end (21) is tapered (truncated-conical shape), in Morse cone, presenting an opening angle (5) between 9 and 15°.

According to a preferred embodiment, the zygomatic dental implant set (100) of the present invention also has a first extender (30). The first extender (30) is coupled to a second end (22) of the intermediate connecting member (20). As seen in FIG. 8, the height ($h_1$) of the first extender (30) can be advantageously dimensioned in order to customize a total length of the set (100) according to the needs of each patient.

The set (100) also comprises a prosthetic abutment (40), illustrated, for example, in FIGS. 12*a* and 12*b*. A first end (41) of the prosthetic abutment (40) comprises an outer thread (42), the outer thread (42) of the prosthetic abutment

(40) being coupled to a first inner thread (23) of the intermediate connecting member (20). The prosthetic abutment (40) further comprises a second end (43) configured to receive and secure a dental prosthesis (not illustrated).

In one embodiment, the prosthetic abutment (40) receives a dental prosthesis in a blind hole (44), which can be seen in FIGS. 13a and 13b. The surface of the blind hole (44) comprises an inner thread (45), for example an M1.4 thread.

According to one embodiment of the present invention, the prosthetic abutment (40) can be chosen between a mini-conical type prosthetic abutment (FIG. 12a) or a morse-type prosthetic abutment (FIG. 12b). According to one embodiment, the dentist will be able to choose which interface best suits the dental implant in each case, without the need for extra fixation and placement parts.

Optionally, the zygomatic dental implant set (100) may comprise a second extender (50), in order to further expand the adaptation/personalization possibilities of the set (100). Different embodiments of the second extender (50) can be seen in FIGS. 14, 15a and 15b.

A first end (51) of the extender (50) comprises an outer thread (52), for example an M1.8 thread. The outer thread (52) of the second extender (50) is coupled to a corresponding inner thread (11) of the implant pin (10). The second extender (50) is configured to receive the first end (21) of the intermediate connecting member (20) in a blind hole (53) formed in a second end (54) of the second extender (50).

In an alternative embodiment, as seen in FIGS. 20a to 20f, the set (100) also comprises a nut (60). As can be seen in FIG. 2, the nut (60) is coupled to the outer thread (42) of the prosthetic abutment (40) and is configured to prevent radial and/or axial movement of the first extender (30) in relation to the intermediate connecting member (20).

The first inner thread (23) of the intermediate connecting member (20) is located in a blind hole (24) formed in the second end (22) of the intermediate connecting member (20). Advantageously, the first extender (30) comprises a through hole (31) defining a free channel that allows the first end (41) of the prosthetic abutment (40) to be received by the blind hole (24) of the intermediate connecting member. (20).

As illustrated in FIGS. 7 to 10, in an embodiment of the present invention, the first extender (30) comprises a plurality of recesses (32) formed in a first end (33) of the first extender (30) and the intermediate connecting member (20) comprises a plurality of corresponding projections (25) formed on the second end (22) of the intermediate connecting member (20). In this way, the coupling between the first extender (30) and the intermediate connecting member (20) is carried out by fitting the plurality of recesses (32) with the plurality of projections (25). This coupling, illustrated in FIG. 11, is carried out by moving the first extender (30) towards the second end (22) of the intermediate connecting member (20) in one direction (S), allowing the projections (25) to engage in the recesses (32).

In one embodiment, the plurality of projections (25) comprises 4 projections uniformly distributed on an edge of the second end (22) of the intermediate connecting member (20). In this embodiment, the plurality of recesses (32) comprises 4 recesses, also uniformly distributed on the first end (33) of the first extender (30). A person skilled in the art will immediately realize that other numbers of projections (25) and recesses (32) are perfectly possible, as long as they enable coupling between the intermediate connecting member (20) and the first extender (30).

In one embodiment of the present invention, the projections (25) comprise a substantially parallelepipedal shape, whose length, height and width dimensions vary between 0.4 and 0.6 mm. Correspondingly, the recesses (32) comprise gaps also of substantially parallelepipedal shape, whose length, height and width dimensions vary between 0.4 and 0.6 mm.

A person skilled in the art will immediately notice that different shapes and dimensions of the projections (25) and recesses (32) can be used, such as substantially conical, semi-spherical shapes, among others. Furthermore, the projections (25) and recesses (32) can be sized so that fitting occurs only after moving the parts in more than one direction, or occurs due to relative rotation between the components, or further only occurs after a specific alignment between the components (Poka Yoke fitting).

In a particularly advantageous embodiment, the fitting between the plurality of projections (25) and the plurality of recesses (32) is carried out with a gap between 0.01 and 0.03 mm in one or more of the dimensions of length, height and width. Thanks to the gap, the fitting between the intermediate connecting member (20) and the first extender (30) does not assemble due to interference and also makes it possible to exchange only the first extender (30) by the practician, if the length is not the most adequate.

The first extender (30) further comprises a cylindrical-shape body with a height ($h_1$) between 1.5 and 4.5 mm, wherein the first extender (30) comprises a tapered inner region (34) with diameter ($d_1$) between 2.5 and 3.5 mm. The nut (60) comprises a corresponding tapered projection (61), so that movement of the first extender (30) in relation to the intermediate connecting member (20) is prevented by contact between the inner tapered region (34) of the first extender (30) and the tapered projection (61) of the nut (60).

Furthermore, the first extender (30) can have a wall thickness between 0.8 and 1.5 mm, guaranteeing its mechanical robustness.

The second extender (50) comprises a substantially elongated body provided with a first section (50a) of substantially conical shape with a height ($h_2$) between 5 and 10 mm and a diameter between 1.7 and 4.0 mm, in addition to a second section (50b) of substantially cylindrical shape with a height ($h_3$) between 2 and 12 mm and a diameter between 3.0 and 4.0 mm. Preferably, the second section (50b) extends contiguously and coaxially from the first section (50a).

In one embodiment, the first section (50a) comprises the first end (51) and the second section (50b) comprises the second end (54) of the second extender (50). Furthermore, the second section (50b) may comprise a flange (56) with a diameter between 3.5 and 4.5 mm. It should be noted that the diameter of the flange (56) is bigger than the diameter of the first section (50a) and the second section (50b).

When the second extender (50) is used, it should be noted that the implant pin (10) comprises a blind hole (13) with a tapered shape adapted to receive the first section (50a). When the second extender (50) is not present in the set (100), the blind hole (13) of the implant pin (10) can be adapted to receive the first end (21) of the intermediate connecting member (20).

As illustrated in FIGS. 15a and 15b, the heights ($h_2$) and ($h_3$) of the second extender (50) can be advantageously sized to customize the total length of the set (100).

In the state of the art, when there is a need for surgery on the zygomatic bone due to the absence of maxillary bone, the physical space requires longer implants, which when positioned tend to have their outer thread visible, increasing the possibility of bone loss due to the action of bacteria. The second extender (50) according to the present invention has external surfaces of the first section (50a) and second section (50b) that are substantially smooth, with the exception of the part provided with an outer thread (52), allowing the use of an implant pin (10) of shorter length, where its outer thread (12) is completely internalized in the zygomatic bone, which leads to a much more efficient physical seal and reduces the chances of infections.

In one embodiment of the present invention, the intermediate connecting member (20) comprises a first section (20a) extending along an axis (A1). As seen in FIG. 6, the first section (20a) comprises the first end (21) of the intermediate connecting member (20).

The intermediate connecting member (20) also comprises a second section (20b) which extends contiguously from the first section (20a) along an axis (A2), wherein an angle ($\alpha$) between the axes (A$_1$) and (A$_2$) is between 80 and 120°, characterizing the curved shape of the intermediate connecting member (20). In an alternative embodiment of the present invention, not illustrated, the second section (20b) comprises the second end (22) of the intermediate connecting member (20), forming a substantially "L" shaped body.

In another embodiment, the intermediate connecting member (20) may comprise a third section (20c) extending contiguously from the second section (20b) along an axis (A$_3$). In this case, as illustrated in FIG. 6, the third section (20c) comprises the second end (22) of the intermediate connecting member (20). Preferably, an angle ($\beta$) between the axes (A$_2$) and (A$_3$) is between 30 and 80°.

In another embodiment of the present invention, an angle ($\gamma$) between the axes (A$_1$) and (A$_3$) is between 20 and 45°.

It is worth noting that, in a preferred embodiment, the axes (A$_1$), (A$_2$) and (A$_3$) are coplanar or substantially coplanar with each other. In general, the angles ($\alpha$), ($\beta$) and ($\gamma$) formed between these axes characterize the substantially curved shape of the intermediate connecting member (20).

The first section (20a) of the intermediate connecting member (20) comprises a through hole (26) provided with a second inner thread (28), for example, an M1.8 thread, configured to receive the screw (70), e.g., also endowed with an M1.8 outer thread (73), with the screw (70) being coupled to the inner thread (11) of the implant pin (10) or to an inner thread (55) of the second extender (50).

If the screw (70) is coupled to the inner thread (11) of the implant pin (10), the coupling between the implant pin (10) and the intermediate connecting member (20) is carried out directly. However, if the second extender (50) is present and the screw (70) is coupled to the inner thread (55) of the second extender (50), the coupling between the implant pin (10) and the intermediate connecting member (20) is carried out indirectly.

In general, the screw (70) is configured to prevent radial and/or axial movement between the intermediate connecting member (20) and the implant pin (10) or between the intermediate connecting member (20) and the second extender (50).

The screw (70) may comprise an elongated cylindrical body and a screw head (71). The screw head (71), which preferably comprises a diameter greater than the diameter of the remainder of the screw (70), is configured to be supported on a stop (27) formed in the first section (20a) of the intermediate connecting member. (20), thus contributing to a firm coupling between the implant pin (10), intermediate connecting member (20) and the second extender (50), if such component is present in the set (100).

Furthermore, the screw (70) can be configured to receive a square key in a corresponding recess (72) located in the screw head (71). However, a person skilled in the art will note that several configuration possibilities for the recess (72) are possible.

The height variations of the first extender (30) and the second extender (50), when used, allow the zygomatic dental implant set (100) to be adapted to the most diverse bone loss scenarios of a patient or even different oral and maxillofacial anatomies.

The intermediate connecting member (20), according to the present invention, can comprise three distinct sections (20a, 20b, 20c) and is particularly advantageous, as it allows the member (20) to be adapted to the most diverse scenarios faced by the dental surgeon. Each patient has a different level of bone loss, different oral and maxillofacial anatomies and a single implant set (100) can be adapted to the most diverse possibilities.

The inventors observed through finite element analysis that the most fragile parts of the set (100) are concentrated in the outer thread (42) of the prosthetic abutment (40). In the analysis carried out, it was observed that this region is the point of greatest dissipation of forces when chewing forces are simulated. In these simulations, it was observed that there could be damage to the set (100) in high intensity efforts, so that a mechanical complement was developed in the form of the first extender (30). The first extender (30) is a reinforced member that can have heights that meet the needs of dental surgeons, with the aim of avoiding greater complications in patients with such a profile.

Patients who have a greater extension between the crest of the ridge and the zygomatic bone, that is, a greater distance from the point of application of force (alveolar ridge) and the point of resistance (implant pin (10) installed in the zygomatic bone) presented a greater force affecting this exposed thread (42), which may present a risk of failure of the set (100). Another factor to be considered is that many patients develop involuntary clenching (effort in various directions on the dental prosthesis), known as nocturnal bruxism, when it occurs during sleep, and awake bruxism, when it occurs during the day. This factor considerably increases the force that affects the set (100), increasing the risk of failure. Therefore, the presence of the prosthetic abutment (40) is essential to avoid such complications. And, the first extender (30) would be used when the thread of the prosthetic abutment (40) became too long and, therefore, weakened.

In implant sets known in the prior art, it is necessary to use a series of components (abutment) that allow the installation of the dental prosthesis (replacement tooth) by screwing. In the prosthetic abutment (40) proposed by the present invention, the entire structure necessary to receive the dental prosthesis is already included in a single piece, avoiding fixation screws.

The length of the outer thread (42) of the prosthetic abutments (40) depends on the height (h$_1$) of the first extender (30). This modification presents significant advantages when using the set (100). The first advantage is in relation to the installation technique used, as it reduces the need to insert a component. The prosthetic abutment (40) designed in a single piece reduces the risk of loosening thereof, since in state-of-the-art abutments the fixation to the assembly is done with a screw installed with a torque of 20 N/cm on average. The development proposed by the present invention advantageously avoids the risk of loosening due to lateral efforts (laterality).

The greater stability of this part of the set (100), i.e. the connection between the prosthetic abutment (40) and the second end (22) of the intermediate connecting member (20)

also eliminates the risk of fatigue in the dental prosthesis screw (not illustrated) and facilitates the passive adaptation of the dental prosthesis to the set (100), a key factor for the long-term success of these treatments.

Furthermore, it is worth noting that the second extender (50), as shown in FIGS. 15*a* and 15*b*, can have different heights to meet the needs of different patients. This development proposed by the present invention relating to the second extender (50) positively contributes mainly to the biological quality of the treatment, while modifications related to the first extender (30) contribute to the improvement of biomechanical factors.

One of the biggest complications regarding zygomatic implants in the state of the art are sinus changes such as chronic sinusitis due to the invasion of the implant into the sinus cavity. Conventional implants most of the time do not expose the maxillary sinus, avoiding this complication, but in some cases it is necessary to expose it to install the abutment and in more remote cases, expose the sinus to install larger fixations due to the bone anatomy.

The use of the second extender (50), when present, practically eliminates the need to interfere, even discreetly, in the sinus cavity, reducing the risk of contamination of both the set (100) and the maxillary sinus. Due to the fact that the second extensor (50) comprises a Morse (conical) connection at its first end (51), there is no compromise to the set (100) from a biomechanical point of view.

Therefore, it is clear that although zygomatic implants known in the state of the art have demonstrated satisfactory results in their clinical use, the popularization of their use has brought to light some clinical inconveniences due to the anatomical variations resulting from the loss of teeth and resorption of the jawbones.

Thus, the set (100) of the present invention presents improved mechanical stability, reducing the risk of complications in patients with a long lever arm due to the distance from the maxilla and the alveolar ridge to the zygomatic bone and biological complications. Furthermore, the zygomatic dental implant set (100) reduces the risk of exposure of the maxillary sinus, avoiding the risk of acute or chronic sinusitis and increasing treatment indications and procedure safety.

Despite the description of the particular embodiments above, the present invention may be carried out differently and may present modifications in its form of implementation, so that the scope of protection of the invention is limited solely by the content of the attached claims, including all possible equivalent variations.

The invention claimed is:

1. A zygomatic dental implant set (100) comprising:
an implant pin (10) configured to be anchored in the zygomatic bone;
an intermediate connecting member (20) comprising a curved shape; wherein a first end (21) of the intermediate connecting member (20) is configured to be coupled directly or indirectly to the implant pin (10);
a first extender (30), wherein the first extender (30) is coupled to a second end (22) of the intermediate connecting member (20);
a prosthetic abutment (40), wherein a first end (41) of the prosthetic abutment (40) comprises an outer thread (42), wherein the outer thread (42) of the prosthetic abutment (40) is coupled to a first inner thread (23) of the intermediate connecting member (20); and
a nut (60), wherein the nut (60) is coupled to the outer thread (42) of the prosthetic abutment (40) and is configured to prevent movement of the first extender (30) in relation to the intermediate connecting member (20); and
wherein a second end (43) of the prosthetic abutment (40) is configured to receive a dental prosthesis;
wherein the set (100) comprises a second extender (50) comprising a first section (50*a*) of conical shape with a height (h$_2$) between 5 and 10 mm and a second section (50*b*) of cylindrical shape with a height (h$_3$) between 2 and 12 mm.

2. The set (100) according to claim 1, wherein a first end (51) of the second extender (50) comprises an outer thread (52), wherein the outer thread (52) of the second extender (50) is coupled to an inner thread (11) of the implant pin (10); wherein the second extender (50) is configured to receive the first end (21) of the intermediate connecting member (20) in a blind hole (53) formed in a second end (54) of the second extender (50).

3. The set (100), according to claim 1, wherein the prosthetic abutment (40) being chosen between a mini-conical type prosthetic abutment or a morse-type prosthetic abutment.

4. The set (100), according to claim 1, wherein the intermediate connecting member (20) comprises a first section (20*a*) extending along an axis (A$_1$), the first section (20*a*) comprising the first end (21) of the intermediate connecting member (20), and a second section (20*b*) extending contiguously from the first section (20*a*) along an axis (A$_2$), wherein an angle (α) between the axes (A$_1$) and (A$_2$) is between 80 and 1200; wherein the intermediate connecting member (20) comprises a third section (20*c*) extending contiguously from the second section (20*b*) along an axis (A$_3$), the third section (20*c*) comprising the second end (22) of the intermediate connecting member (20), in which an angle (β) between the axes (A$_2$) and (A$_3$) is between 3° and 80°.

5. The set (100) according to claim 4, wherein the first section (20*a*) of the intermediate connecting member (20) comprises a through hole (26) configured to receive a screw (70), wherein the screw (70) is coupled to the inner thread (11) of the implant pin (10) or to an inner thread (55) of the second extender (50); wherein the screw (70) is configured to prevent movement between the intermediate connecting member (20) and the implant pin (10) or between the intermediate connecting member (20) and the second extender (50).

6. The set (100) according to claim 5, wherein the screw (70) comprises a screw head (71), wherein the screw head (71) is configured to be supported on a stop (27) formed in the first section (20*a*) of the intermediate connecting member (20).

7. A zygomatic dental implant set (100), comprising:
an implant pin (10) configured to be anchored in the zygomatic bone;
an intermediate connecting member (20) comprising a curved shape; wherein a first end (21) of the intermediate connecting member (20) is configured to be coupled directly or indirectly to the implant pin (10);
a first extender (30), wherein the first extender (30) is coupled to a second end (22) of the intermediate connecting member (20);
a prosthetic abutment (40), wherein a first end (41) of the prosthetic abutment (40) comprises an outer thread (42), wherein the outer thread (42) of the prosthetic abutment (40) is coupled to a first inner thread (23) of the intermediate connecting member (20); and a nut (60), wherein the nut (60) is coupled to the outer thread (42) of the prosthetic abutment (40) and is configured to prevent movement of the first extender (30) in relation to the intermediate connecting member (20); and wherein a second end (43) of the prosthetic abutment (40) is configured to receive a dental prosthesis wherein the first inner thread (23) of the intermediate connecting member (20) is located in a blind hole (24) formed in the second end (22) of the intermediate connecting member (20) and by the first extender (30) comprising a through hole (31) that defines a free channel that allows the first end (41) of the prosthetic abutment (40) to be received by the blind hole (24) of the intermediate connecting member (20).

8. A zygomatic dental implant set (100), comprising:

an implant pin (10) configured to be anchored in the zygomatic bone;

an intermediate connecting member (20) comprising a curved shape; wherein a first end (21) of the intermediate connecting member (20) is configured to be coupled directly or indirectly to the implant pin (10);

a first extender (30), wherein the first extender (30) is coupled to a second end (22) of the intermediate connecting member (20);

a prosthetic abutment (40), wherein a first end (41) of the prosthetic abutment (40) comprises an outer thread (42), wherein the outer thread (42) of the prosthetic abutment (40) is coupled to a first inner thread (23) of the intermediate connecting member (20); and a nut (60), wherein the nut (60) is coupled to the outer thread (42) of the prosthetic abutment (40) and is configured to prevent movement of the first extender (30) in relation to the intermediate connecting member (20); and wherein a second end (43) of the prosthetic abutment (40) is configured to receive a dental prosthesis wherein the first extender (30) comprises a plurality of recesses (32) formed in a first end (33) of the first extender (30) and the intermediate connecting member (20) comprising a plurality of corresponding projections (25) formed on the second end (22) of the intermediate connecting member (20), wherein the coupling between the first extender (30) and the intermediate connecting member (20) is carried out by fitting the plurality of recesses (32) with the plurality of projections (25).

9. A zygomatic dental implant set (100), comprising:

an implant pin (10) configured to be anchored in the zygomatic bone;

an intermediate connecting member (20) comprising a curved shape; wherein a first end (21) of the intermediate connecting member (20) is configured to be coupled directly or indirectly to the implant pin (10);

a first extender (30), wherein the first extender (30) is coupled to a second end (22) of the intermediate connecting member (20);

a prosthetic abutment (40), wherein a first end (41) of the prosthetic abutment (40) comprises an outer thread (42), wherein the outer thread (42) of the prosthetic abutment (40) is coupled to a first inner thread (23) of the intermediate connecting member (20); and a nut (60), wherein the nut (60) is coupled to the outer thread (42) of the prosthetic abutment (40) and is configured to prevent movement of the first extender (30) in relation to the intermediate connecting member (20); and wherein a second end (43) of the prosthetic abutment (40) is configured to receive a dental prosthesis wherein the first extender (30) comprises a cylindrical shaped body with a height ($h_1$) between 1.5 and 4.5 mm, wherein the first extender (30) comprises a tapered inner region (34) with a diameter ($d_1$) between 2.5 and 3.5 mm; wherein the nut (60) comprises a corresponding tapered projection (61), wherein the movement of the first extender (30) in relation to the intermediate connecting member (20) is prevented by contact between the inner tapered region (34) of the first extender (30) and the tapered projection (61) of the nut (60).

* * * * *